United States Patent
Bao et al.

(10) Patent No.: US 8,320,386 B2
(45) Date of Patent: Nov. 27, 2012

(54) AGGREGATING PORTS WHILE ALLOWING ACCESS TO SINGLETON PORTS

(75) Inventors: Qi Bao, Westborough, MA (US); George A. Harvey, Marlborough, MA (US); Gerald R. Johnson, Cataumet, MA (US); Whay C. Lee, Cambridge, MA (US); Ted R. Michaud, Medford, NJ (US)

(73) Assignee: Motorola Mobility LLC, Libertyville, IL (US)

( * ) Notice: Subject to any disclaimer, the term of this patent is extended or adjusted under 35 U.S.C. 154(b) by 592 days.

(21) Appl. No.: 12/578,000

(22) Filed: Oct. 13, 2009

(65) Prior Publication Data

US 2011/0085562 A1 Apr. 14, 2011

(51) Int. Cl.
*H04L 12/56* (2006.01)
(52) U.S. Cl. .......................... 370/400; 370/542; 709/238
(58) Field of Classification Search ........................ None
See application file for complete search history.

(56) References Cited

U.S. PATENT DOCUMENTS 6,163,543 A * 12/2000 Chin et al. .................... 370/400

OTHER PUBLICATIONS

Cisco: "Port Aggregation Protocol", May 1, 1998, pp. 1-27, retrieved from the Internet: URL:http://www.ieee802.org/3/trunk_study/april98/finn_042898.pdf, retrieved Nov. 24, 2010, all pages.

Patent Cooperation Treaty, International Search Report and Written Opinion of the International Searching Authority for International Application No. PCT/US2010/049422, Dec. 3, 2010, 10 pages.
IEEE, "IEEE Std 802.3—2005 Part 3: Carrier Sense Multiple Access with Collision Detection (CSMA/CD) Access Method and Physical Layer Specification, Item 43: Link Aggregation," IEEE, 2005, pp. 285-349.
SysKonnect, "White Paper—Link Aggregation According to IEEE 802.3ad," SysKonnect GmbH, 2002, 22 pages. Downloaded from http://www.triumf.ca/canarie/amsterdam-test/References/wp-lag-e.pdf.
Cisco Systems, Inc., "Catalyst 2970 Switch Software Configuration Guide, Understanding Ether Channels, Chapter 28: Configuring Ether Channels, Port Aggregation Protocol," Cisco Systems, Inc., San Jose, CA, USA, Cisco IOS Release 12.2(25)SE, Nov. 2004, pp. 28-3-28-5.
Nortel, "Technical Brief—Split Multi-Link Trunking—Ethernet Routing Switch 8600," Nortel Networks, 2007, North Carolina, USA, 2007, 4 pages.

* cited by examiner

*Primary Examiner* — Brian Roberts

(57) ABSTRACT

Disclosed is a method for aggregating parallel data links connecting two end-point devices into a logical link. If one of the parallel data links is a multi-point link, then an end-point device can still access that link to route traffic to an end station on the link (that is, to a device other than the other end-point device of the logical data link). In the terminology of this disclosure, the logical aggregated link is accessed through an "aggregated port" on an end-point device, while the constituent multi-point link is accessed directly through a "singleton port." By assigning a smaller cost to the aggregated port than to the singleton port, embodiments avoid creating routing loops. In some embodiments, the aggregation is performed at Layer 2 of the Open System Interconnection seven-layer protocol model. Then, the methods of the present invention work well with existing IEEE 802.1 bridging architectures and protocols.

17 Claims, 3 Drawing Sheets

AGGREGATING PORTS WHILE ALLOWING ACCESS TO SINGLETON PORTS

FIELD OF THE INVENTION

The present invention is related generally to computer communications and, more particularly, to network bridging architectures.

BACKGROUND OF THE INVENTION

Computer networks have become standard features of many environments. Often, a new network is introduced alongside an existing network. The multiple networks may or may not share technologies (e.g., one can be wireless while another uses a coaxial cable), but they are often configured to share traffic. For example, a wireless device in a home seeking to access the Internet may direct its traffic to a wireless hub that connects to a DSL line for connectivity to an Internet service provider.

Some network technologies provide "point-to-point" links, that is, links (usually wires or optical fibers) that connect one device to only one other device. Other network technologies (often based on coaxial cables or radio) are called "multi-point" and support many devices communicating simultaneously with each other.

When an environment supports multiple networks, it is possible that there are "parallel" links for data, that is, more than one path may exist for data to move from one given point to another. For applications requiring high-speed data transfers, it is, of course, desirable to use these parallel links to get the data across faster than would be possible by using only one of the parallel links. Known techniques (called "bridging architectures" and using "bridging protocols") have been developed to allow this: The networking environment is queried, and parallel data links are found. If possible, parallel data links are "aggregated" into one logical data link. Then, devices use the logical aggregated data link as if it were a single link whose bandwidth is the sum of the bandwidths of the physical data links that make up the logical data link.

In any bridging architecture, it is important to avoid creating "routing loops" wherein data packets are sent around and around eventually getting nowhere. To prevent these loops, known bridging architectures only aggregate point-to-point links, that is, links that connect only two devices (which devices are usually bridges). While these bridging architectures are able to use links based on multi-point technology, in practice they can only do so when the "multi-point" links are in fact restricted to supporting only two devices. This restriction on the bridging architecture is so strong that if a logical aggregated data link were to be formed that incorporated a multi-point link, in which the multi-point link connects to at least one device in addition to the two end-point devices, then the end-point devices would no longer be able to communicate with that additional device.

BRIEF SUMMARY

The above considerations, and others, are addressed by the present invention, which can be understood by referring to the specification, drawings, and claims. According to aspects of the present invention, multiple parallel data links connecting two end-point communications devices are aggregated into a logical link. If one of the parallel data links is a multi-point link, then an end-point device can still access that multi-point link to route traffic to an end station on the multi-point link (that is, to a device other than the other end-point device of the logical aggregated data link). In the terminology of this disclosure, the logical aggregated link is accessed through an "aggregated port" on an end-point device, while the constituent multi-point link is accessed directly through a "singleton port." (Here, "singleton" simply means "not aggregated.") Using this terminology, a given multi-point link can be simultaneously accessed through an aggregated port and through a singleton port.

Some embodiments assign routing costs to the aggregated port and to the singleton port. By assigning a smaller cost to the aggregated port than to the singleton port, these embodiments avoid creating routing loops.

While the methods of the present invention are very general, in some embodiments, the aggregation is performed at Layer 2 of the Open System Interconnection seven-layer protocol model. Then, the methods of the present invention work well with existing IEEE 802.1 bridging architectures and protocols (including spanning-tree protocols). Note that for purposes of the present disclosure, "bridging" refers to a function that may be performed by a dedicated communications device (that is, by a "bridge") or that may be performed by a general purpose computing device.

In embodiments that support a spanning-tree protocol, the aggregated port and the singleton port can each be assigned a status of disabled, blocking, listening, learning, forwarding, and discarding. The status of the aggregated port can differ from the status of the singleton port.

The data links aggregated together can represent different data rates and different physical-layer technologies, including wired and wireless local area network technologies.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
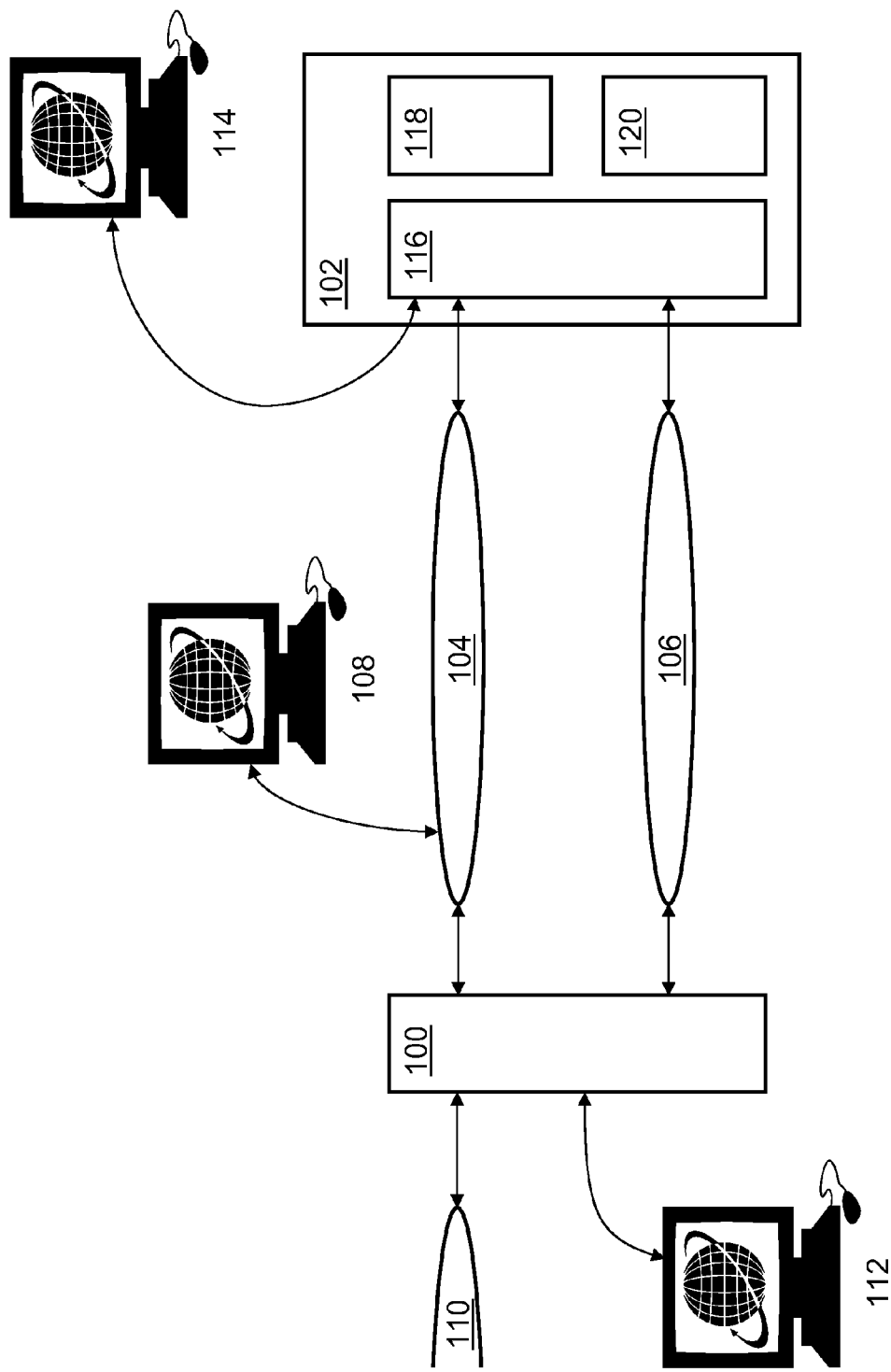
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

FIG. 1 shows a representative local communications environment. Two bridges 100, 102 are connected by at least two communications links 104, 106. The bridges 100, 102 of FIG. 1 are shown as stand-alone devices. In some situations, especially in homes or other small environments, there are no stand-alone bridge devices. Instead, bridging functions are performed by devices such as personal computers, networking hubs, or set-top boxes.

The communications links 104, 106 can represent any number of physical and logical technologies. They may be wired, optical, or wireless, for example. They do not need to be based on the same technology or to support the same data transmission rate. For the purposes of the present discussion, at least one of the links 104, 106 connecting the bridges 100, 102 is a multi-point link (e.g., a local area network or "LAN"). (Because a communications link must connect at least two devices to be useful, a "multi-point" link connects at least three devices and is contrasted with a "point-to-point" link which connects only two devices.) In FIG. 1, link 104 is clearly a multi-point link as it connects to the "end station" 108 in addition to connecting to the two bridges 100, 102. Here, an "end station" is any computing device other than the two bridges 100, 102. Link 106 can be a point-to-point link connecting only the two bridges 100, 102 together, but it can also be another multi-point link with other end stations attached (not shown).

The two bridges 100, 102 can support connections other than the links 104, 106 connecting them together. For each connection, a bridge 100, 102 includes a combination of hardware, software, and firmware called a "port." The bridge 100 in FIG. 1 has ports for the two communications links 104, 106 plus a port for another communications link 110 and a port for an end station 112. Bridge 102 includes, in addition to the ports for the links 104, 106, a port supporting a connection to an end station 114.

As discussed above, calling a device a "bridge" really refers to a function the device performs. The internal structure of a bridge is well known and is often similar to (or identical to) that of other computing devices. Bridge 102 is shown containing port hardware and software 116 supporting its connections to the communications links 104, 106 and to the end station 114. The bridge 102 is controlled by a processor (or by a central processor working with a set of peripheral communications processors) 118 and includes a memory 120. The memory 120 contains software for running the bridge 102 along with tables of port assignments and other data structures useful to the bridge 102.

Imagine the scenario wherein the end station 112 of FIG. 1 needs to transmit data to the end station 114. The bridges 100, 102 support this transmission by using either of the communications links 104, 106 to carry the data. If the required data rate is very large, then the bridges 100, 102 can simultaneously use both communications links 104, 106 to carry that data. To facilitate this, "port-aggregation" techniques allow the bridges 100, 102 to treat the two communications links 104, 106 as if they together made up one logical communications link. The bridges 100, 102 then transmit the data over this logically aggregated link whose bandwidth is the sum of the bandwidths of the constituent communications links 104, 106.

Previous port-aggregation techniques have limitations, however. In particular, once aggregated into a logical link by previous methods, a multi-point link (such as the link 104 in FIG. 1) can only be used by the bridges 100, 102 as if it were a point-to-point link connecting only the two bridges 100, 102. As a result, in the example of FIG. 1, once the links 104, 106 are logically aggregated (by previous methods), then the bridges 100, 102 can no longer communicate with the end station 108.

Aspects of the present invention address this limitation. First, the present discussion uses FIG. 2 to show what is achieved by methods of the present invention. Later, details of how this is achieved are discussed in relation to FIG. 3.

Figure 2:
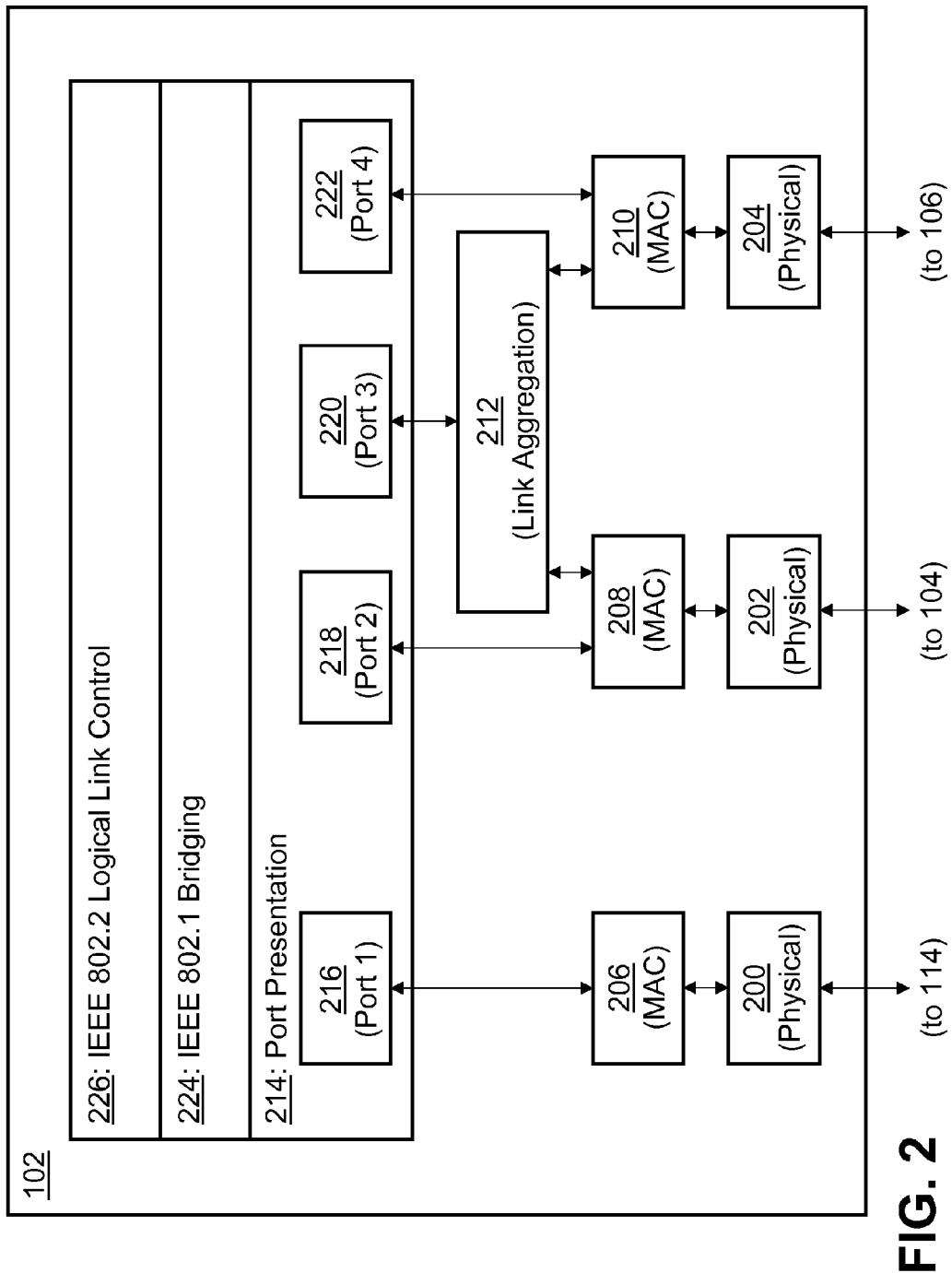
FIG. 2 is a logical schematic of a bridge device running a layered bridging protocol embodying aspects of the present invention.

FIG. 2 shows an embodiment of the internal communications structure created on the bridge 102 when the bridge 102 creates a logically aggregated link. The bridge 102 includes drivers 200, 202, 204 that run the physical-layer protocols for the links 114, 104, 106 attached to the bridge 102. For each link 114, 104, 106, the bridge 102 also includes a driver 206, 208, 210 running the Media Access Control ("MAC") sub-layer of the Data Link Layer protocols. (These layers are part of the Open System Interconnection seven-layer communications model and are well known in the art.)

The Link Aggregation sub-layer 212 (new to the present invention) discovers that links 104 and 106 are parallel and that these links 104, 106 connect the bridges 100 and 102 to each other. To logically aggregate the links 104, 106, the Link Aggregation sub-layer 212 creates a logically aggregated port 220 in the Port Presentation sub-layer 214 (new to the present invention) to represent the aggregated link.

The Port Presentation sub-layer 214 also includes singleton ports 216, 218, and 222 representing the links 114, 104, and 106, respectively. The Port Presentation sub-layer 214 configures all of these ports and exposes them to the upper layers of the protocol stack (represented in FIG. 2 by the Bridging sub-layer 224 of the Data Link Layer and by the Logical Link Control sub-layer 226). (The ports themselves do not interact with the upper-layer bridging functions: The Port Presentation sub-layer 214 mediates these interactions.) In some embodiments, exposing a port involves creating a data structure for that port in a routing table stored in the memory 120 of the bridge 102.

By exposing the ports, the Port Presentation sub-layer 214 allows the singleton ports 216, 218, 222 and the aggregated port 220 to participate in bridging functions. That is to say, just like in the prior art, the exposed aggregated port 220 represents the logical link that aggregates the links 104 and 106. However, and unlike the prior art, the singleton ports 218 and 222 that represent the constituent links 104, 106 of the aggregated link are also exposed for use. Thus, the bridge 102 uses the aggregated port 220 when sending or receiving traffic over the logically aggregated link. At the same time, the bridge can use the exposed singleton port 218 to access the constituent link 104 in its unaggregated manifestation and to thereby send or receive traffic over the link 104 to communicate with, for example, the end station 108. The structure of FIG. 2 thus removes the limitations of the prior art.

Figure 3:
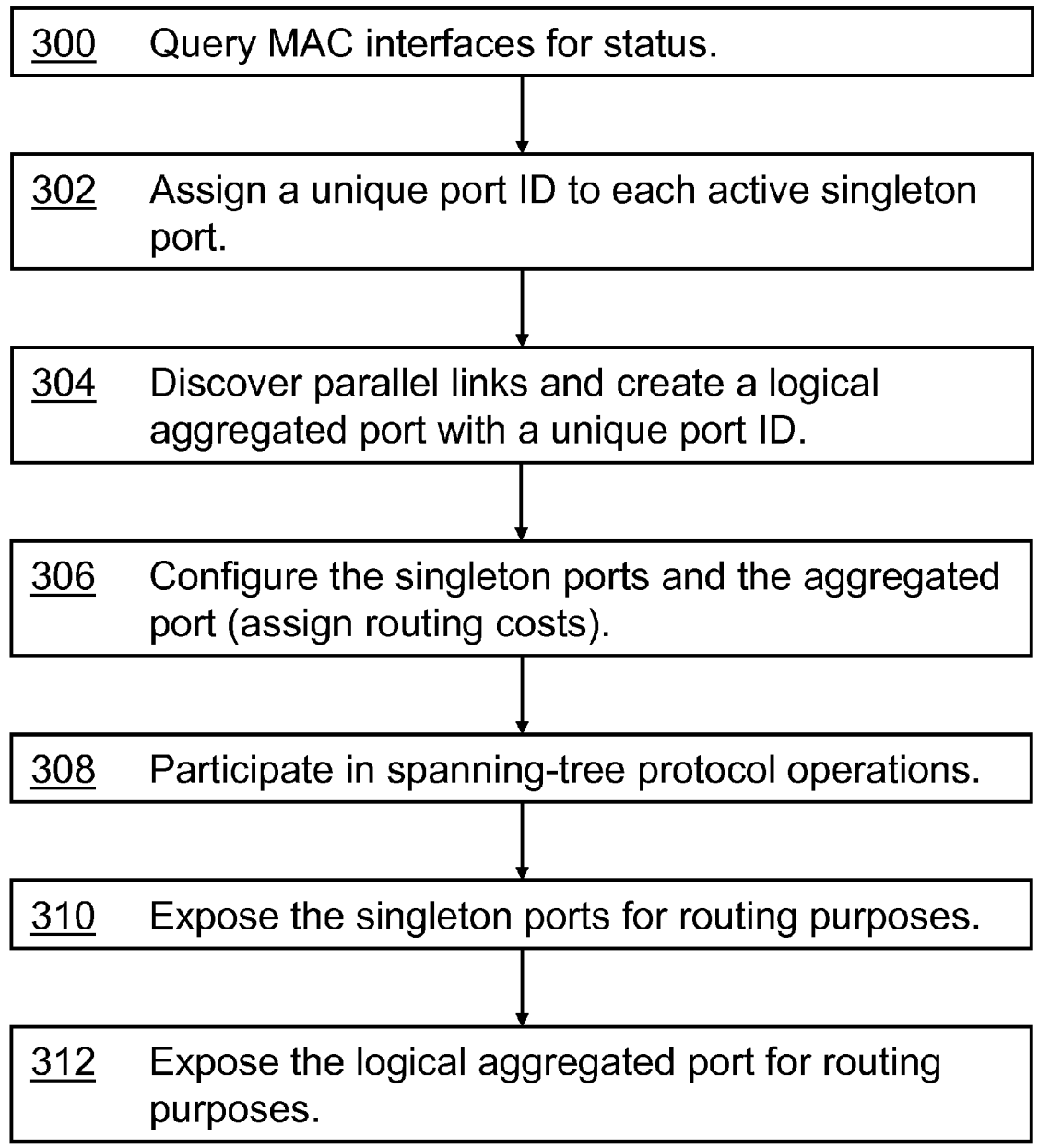
FIG. 3 is a flowchart of a method for aggregating data links according to aspects of the present invention.

The remainder of this discussion uses FIG. 3 to show how the benefits of the present invention are achieved while avoiding the pitfalls of, for example, creating routing loops. The method of FIG. 3 begins in step 300 when the bridge 102 queries its MAC interfaces 206, 208, 210 for status about their respective links. In step 302, the Port Presentation sub-layer 214 assigns a unique port ID to each active singleton port 216, 218, 222. (Note that specific implementations may perform the steps of FIG. 3 in a different order.)

In step 304 of FIG. 3, known techniques are used to discover parallel links that can be aggregated. In the example of FIG. 1, links 104 and 106 are found to be parallel and to link bridges 100 and 102 together. An aggregated port 220 is created to represent the aggregated link, and the aggregated port 220 is assigned a unique port ID.

The active singleton ports 216, 218, 222 and the aggregated port 220 are configured in step 306. As part of the configuration, each port is assigned a routing cost. In embodiments of the present invention, the routing cost assigned to an aggregated link is always smaller than the routing cost assigned to any of that link's constituent links. These routing costs are used by a spanning-tree protocol in step 308.

The spanning-tree protocols of step 308 are well known. Because embodiments of the present invention are designed to use existing spanning-tree protocols without modification, the present discussion assumes a familiarity with these protocols and presents only those details necessary for understanding the present invention.

Bridges within a local communications environment use the spanning-tree protocols to communicate with one another (by exchanging configuration messages known as "Bridge Protocol Data Units") to discover their network topology (i.e., which links connect which bridges). Working together, the bridges select one of themselves to be the "root" of the tree topology. From the information discovered about the local network topology, the bridges create a unique shortest path "tree" topology of logical paths. The tree topology is rooted at the selected bridge. The tree ensures that there is a unique path between each pair of bridges in the local communications environment and that there are no routing loops. For each LAN in the local communications environment, one of the bridges connected to the LAN is selected as a "designated" bridge. The designated bridge is the bridge "closest" to the root bridge. To keep this information up to date, the bridges periodically re-check with one another to see if the local topology has changed.

The spanning-tree protocol assigns a role to each port (whether aggregated or singleton) on each bridge in the local communications environment. The following roles are typical:

Disabled Port: This port is not in operation or is excluded from the active topology.

Root Port: This port is on a selected shortest path to the root bridge from the bridge to which the port belongs.

Designated Port: This port provides each active end station in a LAN segment a shortest path to the root bridge.

Alternate Port: This port belongs to a bridge that has another port as a Root Port. The Alternate Port provides an alternate path to the root bridge from the bridge which the port belongs to.

Backup Port: This port is connected to a LAN segment, but another port on the same bridge is the Designated Port for that LAN segment. A Backup Port provides a backup path to the root bridge for the LAN segment in case the current Designated Port fails.

(Alternate and Backup Ports, which are used in recovery when failures occur in the network, do not relay MAC frames.) A port on a bridge is chosen as the Root Port if the bridge receives the best BPDU (i.e., the one with smallest root-path cost) over that port. A port is assigned the Designated Port role if it can send the best BPDU on the segment to which it is connected.

To operate an embodiment of the present invention without modifying the spanning-tree protocol, it is important to assign the correct roles to singleton ports and to aggregated ports. Otherwise, there is a potential for creating routing loops. This is where the assignment of routing costs (step 306) comes in. Because the routing cost of an aggregated link is set to be lower than the cost of each of the aggregated link's constituent links, the spanning-tree protocol (based on these costs) assigns the aggregated port on the bridge closer to the root as the Designated Port. The aggregated port on the bridge farther from the root bridge is assigned as the Root Port. Also, the singleton ports making up the Root Port aggregated port are assigned as Disabled Ports.

To illustrate the use and importance of these port roles, consider again the local networking topology of FIG. 1 and the port configuration of bridge 102 as shown in FIG. 2. Assume that the spanning-tree protocol has selected bridge 102 as the root bridge. Because the routing cost assigned to the aggregated link (represented by port 220 on bridge 102 and by a similar construct on bridge 100) is smaller than the routing costs assigned to the two constituent links 104 and 106, the spanning-tree protocol selects the aggregated link for routing between the bridges 100 and 102. On the bridge 102, the constituent singleton ports 218 and 222 and the aggregated port 220 are assigned as Designated Ports. On the bridge 100, the aggregated port (not shown) is a Root Port, and the constituent singleton ports (not shown) are Disabled Ports. The result is that the bridges 100 and 102 communicate with one another using the aggregated link, while the bridge 102 can still route traffic to the end station 108 via the singleton port 218 because that port 218 is a Designated Port.

Returning to FIG. 3, once the singleton ports and the aggregated ports have been assigned their roles by the spanning-tree protocol in step 308, the ports are exposed, in steps 310 and 312, for use in normal routing operations.

During normal operations, the singleton ports and the aggregated ports can assume the following states:

Disabled: The port is either a Backup Port or an Alternate Port. It neither learns (i.e., identifies a source MAC address in a MAC frame and updates an entry in a forwarding table) nor forwards MAC frames.

Blocking: Either the bridge associated with this port is initialized (no longer Disabled), or the port is excluded from the active topology by the spanning-tree protocol. The port neither learns nor forwards MAC frames.

Listening: The port is either a Designated Port or a Root Port. It neither learns nor forwards MAC frames. This state may be entered only after the Blocking state.

Learning: The port learns but does not forward MAC frames. This state may be entered only after the Listening state upon expiration of a predetermined protocol timer.

Forwarding: The port learns and forwards MAC frames. This state may be entered only after the Learning state upon expiration of a predetermined protocol timer.

(In the 2003 revision of the spanning-tree protocol, a Discarding state is specified for a port that is disabled, not operational, excluded from the active topology, or excluded from learning and forwarding MAC frames. Thus, the Disabled, Blocking, and Listening states correspond to the new Discarding state.)

In the prior art, the singleton ports of links constituting an aggregated link always share the same state as the port representing the aggregated link. This is no longer true for embodiments of the present invention: The states of an aggregated port and of the constituent singleton ports are independent of one another.

A final consideration to be discussed is MAC-layer addressing. Each bridge keeps a forwarding table. Each entry in the forwarding table specifies a port to which the bridge forwards every MAC frame that has a particular destination MAC address. Initially, the forwarding table is empty, and the bridge populates the forwarding table during a learning process. The bridge checks the source MAC address of each received MAC frame and associates this source address with the port on which this MAC frame is received. The bridge then forwards the frame to all ports that are not Disabled, except for the port on which the frame was received. After the learning process is over, the bridge forwards MAC frames based on entries in the forwarding table. The bridge continues to learn and to update the forwarding table for new MAC addresses during normal operations.

In embodiments of the present invention, for backwards compatibility, each singleton port is assigned a globally unique MAC address which is used as a source address in link-aggregation control frames. A predetermined multicast address is used as a destination address for link-aggregation control frames. The standard Bridge ID (a unique identifier for a bridge within a bridged LAN environment) is the same as in the existing IEEE 802.1D standard. The singleton port MAC frame addressing method retains the original LAN MAC frame format and the addressing method of different LAN technologies (such as Ethernet, MoCA, IEEE 802.11n, etc.). Each MAC frame carries the source and destination MAC addresses of the source and destination end stations, respectively. This addressing method is used by end stations to transmit and receive MAC frames.

In a manner similar to the IEEE 802.3ad standard, each aggregated port is assigned an appropriate MAC address, which is used as a source or destination address in a MAC frame exchanged between two aggregated ports. In the IEEE 802.3ad standard, a MAC address assigned to an aggregated port is typically the MAC address of one of its constituent singleton ports. Where the singleton physical links are shared by legacy bridges and end stations, this address assignment approach can have an undesirable effect on MAC address learning because MAC frames forwarded on an aggregated port can be forwarded on any of its constituent singleton ports. To avoid such undesirable effects, embodiments of the present invention do not statically assign a MAC address to the aggregated port. Instead, the aggregated port is assigned a "floating" MAC address that is the same as the MAC address of the constituent singleton port actually used to forward MAC frames on the aggregated port. With such a dynamic mapping between an aggregated port MAC address and its constituent singleton port MAC addresses, legacy bridges and end stations are not confused by receiving MAC frames carrying erroneous port MAC addresses.

Because legacy bridges and end stations are not equipped to handle MAC frames forwarded over aggregated links, there is a need to distinguish MAC frames destined for an aggregated port from those destined for end stations in a shared LAN segment. In embodiments of the present invention, all MAC frames exchanged between two aggregated ports are encapsulated with an appropriate encapsulation header, wherein the encapsulation header has a format similar to that of a basic Ethernet frame header with a source MAC address field, a destination MAC address field, an Aggregated Link ID field, and an optional sequence number field. The source MAC address of the encapsulation header is the MAC address of the singleton port (i.e., the one that is actually used by the sending bridge to forward MAC frames over the aggregated link) on the originating bridge, and the destination MAC address of the encapsulation header is the MAC address of the receiving singleton port (i.e., the one that is actually used by the receiving bridge to receive MAC frames forwarded by the sending bridge over the aggregated link) on the receiving bridge. The Aggregated Link ID field is used by a singleton port which is a constituent of multiple aggregated ports to forward the frame to the correct aggregated port. The optional sequence number field is used to support reassembly at the receiving bridge if necessary. With such encapsulation, legacy bridges and end stations are able to distinguish MAC frames forwarded over an aggregated link from those that are forwarded over singleton physical links. Thus, end stations on LAN segments connected to constituent singleton ports of an aggregated port can ignore encapsulated frames while an aggregated port on another bridge can recognize and process them accordingly. Note that frame encapsulation described here has one-hop significance between a pair of bridges with link aggregation capability: Upon receiving an encapsulated frame, a bridge strips off the header before further processing the frame.

In view of the many possible embodiments to which the principles of the present invention may be applied, it should be recognized that the embodiments described herein with respect to the drawing figures are meant to be illustrative only and should not be taken as limiting the scope of the invention.

For example, some embodiments of the present invention are designed to use existing spanning-tree protocols without modification. Other embodiments may be developed that depend upon altered protocols. Therefore, the invention as described herein contemplates all such embodiments as may come within the scope of the following claims and equivalents thereof.

We claim:

1. In a networking environment comprising a first communications device and a second communications device, with a first communications link and a second communications link each connected to both the first and second communications devices, with the first communications link connected via a first port to the first communications device, and with the second communications link connected via a second port to the first communications device, a method for setting up routing on the first communications device, the method comprising:

creating, on the first communications device, a logical aggregated port connecting to the first and second ports;

exposing for routing purposes, on the first communications device, the logical aggregated port; and simultaneously with exposing the logical aggregated port, exposing for routing purposes, on the first communications device, the first communications port as a singleton port for access to an end station connected to the first communications link, the end station distinct from the first and second communications devices;

wherein exposing a port for routing purposes comprises adding an entry for the port to a routing table data structure stored in physical memory on the first communications device.

2. The method for setting up routing of claim 1 wherein the first and second communications devices are layer-2 communications devices, wherein layer-2 refers to the Data Link Layer of the Open System Interconnection seven-layer model.

3. The method for setting up routing of claim 1 wherein the first and second communications links are local area networks.

4. The method for setting up routing of claim 1 wherein a physical-layer technology supporting the first communications link differs from a physical-layer technology supporting the second communications link.

5. The method for setting up routing of claim 1 wherein the first communications link supports a data rate different from a data rate supported by the second communications link.

6. The method for setting up routing of claim 1 further comprising:

exposing for routing purposes, on the first communications device, the second communications port as a singleton port.

7. The method for setting up routing of claim 1 further comprising:

querying, by the first communications device, the first and second ports for information and status;

assigning, on the first communications device, a unique port ID to the singleton port;

querying, by the first communications device, the logical aggregated port for information and status;

assigning, on the first communications device, a unique port ID to the logical aggregated port; and participating, by the first communications device, in spanning-tree protocol operations.

8. The method for setting up routing of claim 7 further comprising, before participating in spanning-tree protocol operations:
   assigning, on the first communications device, a routing cost to the logical aggregated port; and
   assigning, on the first communications device, a routing cost to the singleton port;
   wherein the logical aggregated port routing cost is smaller than the singleton port routing cost.

9. In a networking environment comprising a first communications device and a second communications device, and with a first communications link and a second communications link each connected to both the first and second communications devices, the first communications device comprising:
   a first port connecting to the first communications link;
   a second port connecting to the second communications link;
   a memory;
   and a processor operatively connected to the first port, to the second port, and to the memory and configured for:
      creating a logical aggregated port connecting to the first and second ports;
      exposing for routing purposes the logical aggregated port; and
      simultaneously with exposing the logical aggregated port, exposing for routing purposes the first communications port as a singleton port for access to an end station connected to the first communications link, the end station distinct from the first and second communications devices;
   wherein exposing a port for routing purposes comprises adding an entry for the port to a routing table data structure stored in the memory.

10. The first communications device of claim 9 wherein the first communications device is a layer-2 communications device, wherein layer-2 refers to the Data Link Layer of the Open System Interconnection seven-layer model.

11. The first communications device of claim 9 wherein the first communications device is selected from the group consisting of: a bridge, a gateway, a network hub, and a personal computer.

12. The first communications device of claim 9 wherein the first and second communications links are local area networks.

13. The first communications device of claim 9 wherein a physical-layer technology supporting the first communications link differs from a physical-layer technology supporting the second communications link.

14. The first communications device of claim 9 wherein the first communications link supports a data rate different from a data rate supported by the second communications link.

15. The first communications device of claim 9 wherein the processor is further configured for:
   exposing for routing purposes the second communications port as a singleton port.

16. The first communications device of claim 9 wherein the processor is further configured for:
   querying the first and second ports for information and status;
   assigning a unique port ID to the singleton port;
   querying the logical aggregated port for information and status;
   assigning a unique port ID to the logical aggregated port; and
   participating in spanning-tree protocol operations.

17. The first communications device of claim 16 wherein the processor is further configured for, before participating in spanning-tree protocol operations:
   assigning a routing cost to the logical aggregated port; and
   assigning a routing cost to the singleton port;
   wherein the logical aggregated port routing cost is smaller than the singleton port routing cost.

* * * * *